(12) United States Patent
Kato et al.

(10) Patent No.: US 8,877,341 B2
(45) Date of Patent: Nov. 4, 2014

(54) POLYCARBONATE RESIN AND OPTICAL FILM USING THE SAME

(75) Inventors: Noriyuki Kato, Tokyo (JP); Kunitoshi Mimura, Tokyo (JP)

(73) Assignee: Mitsubishi Gas Chemical Company, Inc, Tokyo (JP)

( * ) Notice: Subject to any disclaimer, the term of this patent is extended or adjusted under 35 U.S.C. 154(b) by 1077 days.

(21) Appl. No.: 12/377,679

(22) PCT Filed: Aug. 13, 2007

(86) PCT No.: PCT/JP2007/066060
§ 371 (c)(1),
(2), (4) Date: Apr. 19, 2010

(87) PCT Pub. No.: WO2008/020636
PCT Pub. Date: Feb. 21, 2008

(65) Prior Publication Data
US 2010/0196720 A1    Aug. 5, 2010

(30) Foreign Application Priority Data
Aug. 18, 2006   (JP) ................. 2006-223071

(51) Int. Cl.
*B32B 27/28* (2006.01)
*G02B 5/30* (2006.01)
*C08G 64/02* (2006.01)
*G02F 1/13363* (2006.01)

(52) U.S. Cl.
CPC ............ *C08G 64/0208* (2013.01); *G02B 5/305* (2013.01); *G02F 1/13363* (2013.01)
USPC ...... 428/412; 359/483.01; 528/406; 528/418; 528/419; 528/370

(58) Field of Classification Search
CPC .... B32B 27/365; C08G 64/208; C08G 64/18; B29K 2995/006
USPC .......... 528/196, 370, 406, 418, 419; 428/412; 359/483.01
See application file for complete search history.

(56) References Cited

U.S. PATENT DOCUMENTS

| | | | |
|---|---|---|---|
| 4,506,066 A * | 3/1985 | Medem et al. ................. | 528/196 |
| 5,472,538 A * | 12/1995 | Minakuchi et al. ............. | 156/85 |
| 6,348,559 B1 * | 2/2002 | Fujimori et al. .............. | 528/196 |
| 7,365,148 B2 * | 4/2008 | Ono et al. ....................... | 528/196 |
| 7,642,334 B2 * | 1/2010 | Uchida et al. ................. | 528/195 |
| 2004/0120039 A1 * | 6/2004 | Sato et al. ...................... | 359/465 |
| 2005/0163943 A1 * | 7/2005 | Uchiyama et al. ........... | 428/1.31 |
| 2006/0149024 A1 | 7/2006 | Ono et al. | |
| 2010/0190953 A1 | 7/2010 | Fuji et al. | |

FOREIGN PATENT DOCUMENTS

| | | |
|---|---|---|
| CN | 1805992 A | 7/2006 |
| CN | 101448871 A | 6/2009 |
| EP | 2 033 981 | 3/2009 |
| JP | 2003-292603 | 10/2003 |
| JP | 2006-28441 | 2/2006 |
| JP | 2006-36954 | 2/2006 |
| JP | 2006-232897 | 9/2006 |
| JP | 2007070391 A * | 3/2007 |
| JP | 2007070438 A * | 3/2007 |
| JP | 2009-46519 A | 3/2009 |
| JP | 4626847 B2 | 11/2010 |
| JP | 4759518 B2 * | 5/2011 |
| TW | 200628511 | 8/2006 |
| WO | 2006-041190 | 4/2006 |
| WO | 2007-063823 | 6/2007 |
| WO | 2007/063823 A1 | 6/2007 |

OTHER PUBLICATIONS

Machine translation of JP 2006-232897 (2012).*
Machine translation of JP 2007-070438 (2012).*

(Continued)

*Primary Examiner* — Callie Shosho
*Assistant Examiner* — John Freeman
(74) *Attorney, Agent, or Firm* — Ladas & Parry LLP

(57) ABSTRACT

According to the present invention, a polycarbonate resin having a repeat unit represented by the following formula (1) and a repeat unit represented by the following general formula (2), and an optical film using the same, can be provided.

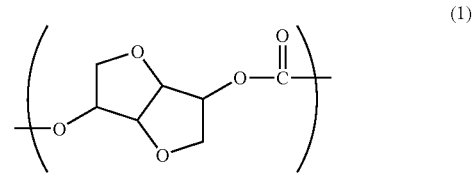

(1)

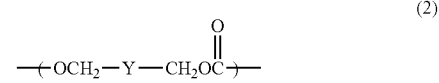

(2)

In the formula, Y is a cycloalkylene group having a carbon number of 4 through 20 or a structure represented by the following general formula (3).

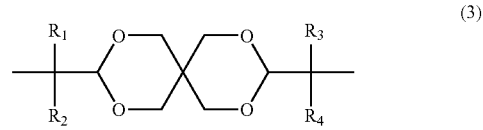

(3)

In the general formula (3), $R_1$, $R_2$, $R_3$ and $R_4$ are independently a hydrogen atom or a monovalent alkyl group having a carbon number of 1 through 5.

8 Claims, No Drawings

(56) References Cited

OTHER PUBLICATIONS

Machine translation of JP 2007-070391 (2012).*
Chatti, S., Kricheldorf, H. R. and Schwarz, G. (2006), Copolycarbonates of isosorbide and various diols. J. Polym. Sci. A Polym. Chem., 44: 3616-3628. doi: 10.1002/pola.21444.*
Cyclic and Noncyclic Polycarbonates of Isosorbide (1,4:3,6-Dianhydro-d-glucitol) Saber Chatti, Gert Schwarz, and Hans R. Kricheldorf Macromolecules 2006 39 (26), 9064-9070.*
F. Fenouillot, A. Rousseau, G. Colomines, R. Saint-Loup, J.-P. Pascault, Polymers from renewable 1,4:3,6-dianhydrohexitols (isosorbide, isomannide and isoidide): A review, Progress in Polymer Science, vol. 35, Issue 5, May 2010, pp. 578-622, ISSN 0079-6700, 10.1016/j.progpolymsci.2009.10.001.*
Machine translation of JP 4759518 (2012).*
Patent Abstracts of Japan of JP 2006-232897 dated Sep. 7, 2006.
Patent Abstracts of Japan of JP 2006-36954 dated Feb. 9, 2006.
Patent Abstracts of Japan of JP 2006-28441 dated Feb. 2, 2006.
Patent Abstracts of Japan of JP 2003-292603 dated Oct. 15, 2003.
English abstract of TW 200628511.
Office Action for Application No. JP 2008-529894.

* cited by examiner

POLYCARBONATE RESIN AND OPTICAL FILM USING THE SAME

TECHNICAL FIELD

The present invention relates to a polycarbonate resin derived from a specific dihydroxy compound, and an optical film. Specifically, a preferable embodiment of the present invention relates to a polycarbonate resin and an optical film which are excellent in transparency, thermal resistance, mechanical strength, and water vapor permeability, and are low in photo elasticity.

BACKGROUND ART

A conventional aromatic polycarbonate resin obtained by reacting 2,2-bis(4-hydroxyphenyl)propane (generally called "bisphenol A") with phosgene or carbonic acid ester is excellent in thermal resistance and transparency and also in mechanical characteristics such as impact resistance and the like, and therefore is widely used as a structural material and also as an optical material for optical disc substrates, various types of lenses, prisms, optical fibers and the like.

Although having the thermal resistance and the mechanical strength, the conventional aromatic polycarbonate resin has a problem of a large photo-elastic coefficient when used as an optical film. For example, when the conventional aromatic polycarbonate resin is used as a phase film of a liquid crystal display and attached to a polarization plate, the following problem occurs. The phase film is stressed by thermal contraction, thermal expansion or the like of the polarization plate. As a result, phase spots appear and the uniformity of an image quality cannot be maintained.

The conventional aromatic polycarbonate resin also has the following problem when used as a phase plate. Even where a ¼ wave plate and a ½ wave plate are stacked together at an optimum angle in order to form a wide band circular polarization plate, the circular polarizability is insufficient over the entire wavelength range of visible light due to a large wavelength dependence of the phase contrast.

As a protective film for a polarization plate, triacetylcellulose (hereinafter, referred to as "TAC") is mainly used especially in liquid crystal displays owing to superb characteristics thereof in terms of transparency, smoothness, thickness precision, adhesion and moisture permeability ratio. However, the liquid crystal displays are desired to have higher functions such as improved durability, polarization plate-protective films having a phase film function, and the like. In order to achieve such purposes, a polarization plate-protective film formed of cyclic polyolefin has been proposed. However, such a polarization plate-protective film has problems that air bubbles are generated and the film is deformed, for example, curled or warped, due to a low water vapor permeability thereof.

A known method for decreasing the photo-elastic coefficient of polycarbonate is described in, for example, Japanese Laid-Open Patent Publication No. 64-66234. According to this method, bisphenol A is copolymerized with tricyclo[5.2.1.0$^{2,6}$]decanedimethanol. However, this method decreases the thermal resistance and does not provide a sufficient effect of decreasing the photo-elastic coefficient. There is another known method of copolymerizing a bisphenol having a fluorene structure in a side chain with another bisphenol (see Japanese Laid-Open Patent Publications Nos. 6-25398 and 7-109342). With such a method, a bisphenol containing a fluorene structure is used at a high ratio in order to decrease the photo-elastic coefficient. As a result, the glass transition temperature is raised. Therefore, the process temperatures during the production of phase films, such as a temperature for film melting molding, a temperature for film stretching and the like are raised. This causes a problem of coloring, and also makes it difficult to produce the films with the film thickness, the phase contrast and the like being controlled with high precision.

According to a known method for controlling the wavelength dependence of a polycarbonate resin caused by the phase contrast, for example, a bisphenol having a fluorene structure in a side chain with another bisphenol (see the pamphlet of PCT International Publication WO2000/26705). However, as in the above-mentioned case of decreasing the photo-elastic coefficient, such a method uses a bisphenol having a fluorene structure at a high ratio and has a problem of a high glass transition temperature.

As a technology for improving the water vapor permeability of a polycarbonate resin, a method of forming microscopic holes in the film is known. However, such a film cannot be used as an optical film. As such, there has been no effective means for improving the water vapor permeability of a polycarbonate resin.

DISCLOSURE OF THE INVENTION

The present invention has an object of providing a polycarbonate resin for solving at least one of the above-described problems of the conventional art and an optical film using the same. As a preferable embodiment, the present invention has another object of providing a polycarbonate resin which is low in photo-elastic coefficient and excellent in water vapor permeability, transparency, thermal resistance, mechanical strength and moldability, and an optical film using the same.

As a result of performing active studies for solving the above-described problems, the present inventors found that a polycarbonate resin having a repeat unit represented by the following formula (1) and a repeat unit represented by the following general formula (2), and an optical film using the same, can solve the above-described problems and arrived at the present invention.

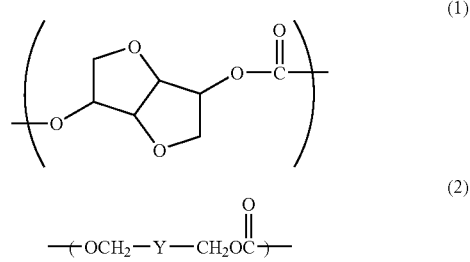

(1)

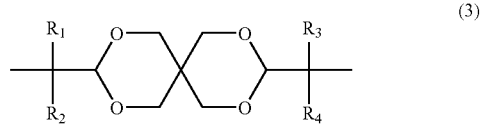

(2)

In the formula, Y is a cycloalkylene group having a carbon number of 4 through 20 or a structure represented by the following general formula (3).

(3)

In the general formula (3), $R_1$, $R_2$, $R_3$ and $R_4$ are independently a hydrogen atom or a monovalent alkyl group having a carbon number of 1 through 5.

According to a preferable embodiment of the present invention, a polycarbonate resin and an optical film having a low photo-elastic coefficient and having controlled water vapor permeability and controlled water absorption ratio can be produced. By combining a phase film according to the present invention with a polarization plate, wide viewing-angle films, circular polarization plates or elliptical polarization plates can be produced. Wide viewing-angle films are usable for liquid crystal displays, and circular polarization plates are preferably usable as reflection preventive films in organic or inorganic electroluminescence elements, touch panels, plasma displays, CRTs, liquid crystal displays and the like. A polarization plate usually has a stacking structure including a polarization layer of a polyvinyl alcohol (PVA) film or the like and a protective layer of a TAC film. Where the phase film according to the present invention is used, the phase film can be directly attached to PVA used as the polarization layer without using the protective film of TAC.

BEST MODE FOR CARRYING OUT THE INVENTION

Hereinafter, the present invention will be described in more detail.

The above-mentioned polycarbonate resin can be produced by reacting a dihydroxy compound represented by the following formula (4) and a dihydroxy compound represented by the general formula (5) with a carbonic acid ester-forming compound.

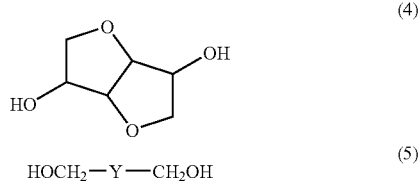

(4)

$$HOCH_2-Y-CH_2OH$$ (5)

In the formula, Y is a cycloalkylene group having a carbon number of 4 through 20 or a structure represented by the following general formula (6).

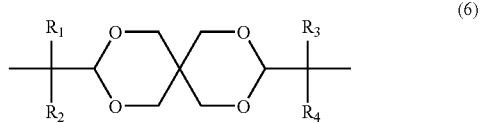

(6)

In the general formula (6), $R_1$, $R_2$, $R_3$ and $R_4$ are independently a hydrogen atom or a monovalent alkyl group having a carbon number of 1 through 5.

Examples of the dihydroxy compound represented by formula (4) used in the present invention include isosorbide and isomannide. Two types of the dihydroxy compounds may be used in combination.

Examples of the dihydroxy compound represented by the general formula (5) used in the present invention include tricyclo(5.2.1.0$^{2,6}$)decanedimethanol, pentacyclopentadecanedimethanol, 2,6-decalinedimethanol, 1,4-cyclohexanedimethanol, norbornanedimethanol, cyclopentane-1,3-dimethanol, 3,9-bis(2-hydroxy-1,1-dimethylethyl)-2,4,8,10-tetraoxaspiro(5,5)undecane, and the like. Preferable examples are tricyclo(5.2.1.0$^{2,6}$)decanedimethanol, pentacyclopentadecanedimethanol, 1,4-cyclohexanedimethanol, and 3,9-bis(2-hydroxy-1,1-dimethylethyl)-2,4,8,10-tetraoxaspiro(5,5)undecane.

In the present invention, the molar ratio of structural unit (A) represented by the formula (1) and structural unit (B) represented by the general formula (2), i.e., the molar ratio A/B, is 99/1 to 1/99, more preferably 90/10 to 20/80, and most preferably 80/20 through 30/70. When the molar ratio A/B is higher than 90/10, the water absorption ratio is too high. As a result, the size change of the film in accordance with the humidity is too large and so it is difficult to maintain the phase contrast uniform. When the molar ratio A/B is lower than 20/80, the water vapor permeability is too low, and the thermal resistance is too low due to the reduction of the glass transition temperature.

By varying the molar ratio A/B within the above-mentioned range, the water vapor permeability and the water absorption ratio can be controlled to be at a desired level.

In the polycarbonate resin according to the present invention, a structural unit derived from an aromatic dihydroxy compound may be introduced, in addition to the repeat units represented by the formula (1) and the general formula (2), in the range in which the achievement of above-described objects of the present invention is not obstructed. With such introduction, the mechanical properties, thermal resistance, phase contrast dispersion characteristic in accordance with the wavelength and the like can be improved.

Examples of the aromatic dihydroxy compound include 2,2-bis(4-hydroxyphenyl)propane (usually called "bisphenol A"), 1,1-bis(4-hydroxyphenyl)cyclo hexane, 1,1-bis(4-hydroxyphenyl)-3,3,5-trimethylcyclohexane, 1,1-bis(4-hydroxyphenyl)cyclopentane, 1,1-bis(4-hydroxyphenyl)-1-phenylethane, 4,4'-(1,3-phenylene-bis(1-methylethylidene))bisphenol, 4,4'-(1,4-phenylene-bis(1-methylethylidene))bisphenol, 2,2-bis(4-hydroxyphenyl)-4-methylpentane, 1,1-bis(4-hydroxyphenyl)ethane, bis(4-hydroxyphenyl)methane, bis(4-hydroxyphenyl)phenylmethane, 2,2-bis(4-hydroxy-3-propylphenyl)propane, 2,2-bis(4-hydroxy-3-(1-methylethyl)phenyl)propane, 2,2-bis(4-hydroxy-3-(1-methylpropyl)phenyl)propane, 2,2-bis(4-hydroxy-3-tert-butylphenyl)propane, 2,2-bis(4-hydroxy-3-cyclohexylphenyl)propane, 2,2-bis(4-hydroxy-3-phenylphenyl)propane, 2,2-bis(4-hydroxy-2-methyl-5-(1-methylethyl)phenyl)propane, 1,1-bis(4-hydroxy-3-tert-butyl-6-methylphenyl)-2-methylpropane, 1,1-bis(4-hydroxy-3-tert-butyl-6-methylphenyl)butane, 1,1-bis(4-hydroxy-3-cyclohexyl-6-methylphenyl)-2-methylpropane, 2,2-bis(4-hydroxy-3-tert-butyl-6-methylphenyl)propane, 1,1-bis(4-hydroxy-3-(1-methylethyl)phenyl)cyclo hexane, 1,1-bis(4-hydroxy-3-tert-butylphenyl)cyclohexane, 1,1-bis(4-hydroxy-3-(1-methylpropyl)phenyl)cyclohexane, 1,1-bis(4-hydroxy-3-cyclohexylphenyl)cyclohexane, 1,1-bis(4-hydroxy-3-phenylphenyl)cyclohexane, 1,1-bis(4-hydroxy-3-(1-methylethyl)phenyl)cyclopentane, 1,1-bis(4-hydroxy-3-cyclohexylphenyl)cyclopentane, 1,1-(4-hydroxy-3-tert-butylphenyl)cyclopentane, 4,4'-(1,3-phenylene-bis(1-methylethylidene))bis-(2-cyclohexyl-5-methylphenol), 4,4'-(1,4-phenylene-bis(1-methylethylidene))bis-(2-cyclohexyl-5-methylphenol), 4,4'-(1,3-phenylene-bis(1-methylethylidene))bis(2-(1-methylethyl)phenol), 1,1-bis(4-hydroxy-3-(1-methylethyl)phenyl)-1-phenylethane, 1,1-bis(4-hydroxy-3-tert-butyl)-1-phenylethane, 4,4'-dihydroxydiphenylether, 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone, 4,4'-dihydroxydiphenylsulfone, 4,4'-dihydroxy-3,3'-dimethyldiphenylsulfone, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3,5-dimethylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, and the like. Two or more types of the aromatic dihydroxy compounds may be used in combination.

The glass transition temperature of the polycarbonate resin according to the present invention is preferably 90° C. or higher and 200° C. or lower, and more preferably 100° C. or higher and 190° C. or lower. When the glass transition temperature is lower than 90° C., the thermal resistance is deteriorated, which is not preferable because the phase contrast is changed drastically in accordance with the environment of use. When the glass transition temperature is higher than 200° C., the moldability is changed, which deteriorates the external appearance of the film and also makes it difficult to control the film thickness and the phase contrast.

The polystyrene-converted weight average molecular weight of the polycarbonate resin according to the present invention is preferably 30,000 to 200,000, and more preferably 40,000 to 150,000. When the polystyrene-converted weight average molecular weight is lower than 30,000, the film moldability and the film strength are decreased. When the polystyrene-converted weight average molecular weight is higher than 200,000, the fluidity is deteriorated, which makes the molding conditions more strict and is not preferable.

Polycarbonate having a bisphenol A skeleton which is conventionally in wide use for optical films is excellent in transparency, thermal resistance and mechanical strength, but has a problem of a high photo-elastic coefficient. For example, when such a polycarbonate film is used as a phase film of a liquid crystal display and attached to a polarization plate, the following problem occurs. The phase film is stressed by thermal contraction, thermal expansion or the like of the polarization plate. As a result, phase spots appear and the uniformity of an image quality cannot be maintained. An optical film containing the polycarbonate resin according to the present invention preferably has a photo-elastic coefficient of $30 \times 10^{-12}$ m$^2$/N or lower, and more preferably of $20 \times 10^{-12}$ m$^2$/N or lower.

When used as a protective film of a polarization plate, the optical film according to the present invention preferably has a water vapor permeability ratio of 100 g/m$^2$/day/25 μm or higher, and more preferably of 150 g/m$^2$/day/25 μm or higher, in order to prevent air bubble generation and curling.

When used as a protective film of a polarization plate, the optical film according to the present invention preferably has a water absorption ratio of 4% or lower, and more preferably of 3% or lower, in order to avoid size change of the film caused by the influence of humidity.

The polycarbonate resin according to the present invention can be produced by a known production method. Usable methods include an interface polycondensation method, a pyridine method, a melt polycondensation method by transesterification, and the like. Especially, a known melt polycondensation method of reacting a dihydroxy compound with carbonic acid diester under the presence of a basic compound catalyst is preferably used. Hereinafter, the melt polycondensation method will be described.

Specific examples of the carbonic acid diester used for producing polycarbonate by the melt polycondensation method include diaryl carbonates such as diphenyl carbonate, ditolyl carbonate, bis(chlorophenyl) carbonate, m-cresyl carbonate and the like; and aliphatic carbonate compounds such as dimethyl carbonate, diethyl carbonate, diisopropyl carbonate, dibutyl carbonate, diamyl carbonate, dioctyl carbonate and the like. Among these, diphenyl carbonate is especially preferable. Such an additive is used at a ratio of 0.97 to 1.10 mols, preferably of 0.98 to 1.05 mols, with respect to a total of 1 mol of the dihydroxy compound.

Usable basic compound catalysts specifically include alkaline metal compounds and/or alkaline earth metal compounds, nitrogen-containing compounds and the like.

Preferably usable examples of such a compound include organic acid salts such as alkaline metal compounds and alkaline earth metal compounds and the like; inorganic salts; oxides; hydroxides; hydrides, and alkoxides; quaternary ammonium hydroxides and salts thereof; amines and the like. These compounds may be used independently or in combination.

Usable alkaline metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium boron phenylate, sodium benzoate, potassium benzoate, cesium benzoate, lithium benzoate, disodium hydrogen phosphate, dipotassium hydrogen phosphate, dilithium hydrogen phosphate, disodium phenylphosphate; disodium salts, dipotassium salts, dicesium salts and dilithium salts of bisphenol A; sodium salts, potassium salts, cesium salts and lithium salts of phenol; and the like.

Usable alkaline earth metal compounds include, specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate, and the like.

Usable nitrogen-containing compounds include, specifically, quaternary ammonium hydroxides having an alkyl group, an aryl group, or the like such as tetramethylammonium hydroxide, tetraethylammonium hydroxide, tetrapropylanmonium hydroxide, tetrabutylammonium hydroxide, trimethylbenzylammonium hydroxide, etc.; tertiary amines, such as triethylamine, dimethylbenzylamine, triphenylamine, etc.; secondary amines such as diethylamine, dibutylamine, etc.; primary amines such as propylamine, butylamine, etc.; imidazoles such as 2-methylimidazole, 2-phenylimidazole, benzoimidazole, etc.; bases and basic salts such as ammonia, tetramethylammonium borohydride, tetrabutylammonium borohydride, tetrabutylammonium tetraphenylborate, tetraphenylammonium tetraphenylborate, etc.; and the like.

Preferably usable transesterification catalysts include salts of zinc, tin, zirconium and lead. These are usable independently or in combination.

Usable transesterification catalysts include, specifically, zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II), lead acetate (IV), and the like.

Such a catalyst is used at a ratio of $10^{-9}$ to $10^{-3}$ mols, preferably of $10^{-7}$ to $10^{-4}$, with respect to a total of 1 mol of the dihydroxy compound.

A melt polycondensation method according to the present invention is carried out using any of the above-described materials and catalysts, while sub products are removed by the transesterification reaction under heating at normal pressure or reduced pressure. The reaction generally occurs in multiple steps of two or more.

Specifically, a first step reaction is caused at a temperature of 120 to 260° C., preferably 180 to 240° C. for 0.1 to 5 hours, preferably 0.5 to 3 hours at a pressure of normal pressure to 200 Torr. Next, the reaction is continued while raising the temperature gradually up to the final temperature of 200 to 300° C. and reducing the pressure gradually down to the final pressure of 1 Ton, over 1 to 3 hours. Finally, the polycondensation is performed at the reduced pressure of 1 Torr and a temperature of 200 to 300° C. When the viscosity reaches a prescribed level, the pressure is recovered by nitrogen. Thus, the reaction is terminated. The reaction time at a pressure of 1 Torr or lower is 0.1 to 2 hours, and the total reaction time is 1 to 6 hours, normally 2 to 5 hours.

Such a reaction may be performed continuously or in batches. A reaction apparatus used for the above-described reaction may be of a vertical type including anchor stirring wings, max blend stirring wings, helical ribbon stirring wings or the like; of a horizontal type including paddle wings, lattice wings, glass-shaped wings or the like; or an extruder type including a screw. A reaction apparatus obtained by combining these reaction apparatuses in consideration of the viscosity of the polymers is also preferably usable.

In the polycarbonate resin according to the present invention, the catalyst is removed or inactivated after the polymerization reaction is terminated, in order to maintain the thermal stability and the hydrolysis stability. Generally, it is preferable to inactivate the catalyst by adding a known acidic substance. Specific preferable examples of such a substance include aromatic sulfonic acids such as p-toluenesulfonic acid, etc.; aromatic sulfonic acid esters such as butyl p-toluenesulfonate, hexyl p-toluenesulfonate, etc.; aromatic sulfonates such as tetrabutylphosphonium dodecylbenzenesulfonate, etc.; organic halides such as chloride stearate, benzoyl chloride, chloride p-toluenesulfonate, etc.; alkyl sulfuric acids such as dimethyl sulfate, etc.; organic halides such as benzyl chloride, etc.; and the like.

After the catalyst is inactivated, a step of volatilizing and removing the low boiling point compound in the polymer at a pressure of 0.1 to 1 mmHg and a temperature of 200 to 350° C. may be provided. For this step, a horizontal apparatus including stirring wings having a high capability of updating the surface such as paddle wings, lattice wings, glass-shaped wings or the like, or a thin film vaporizer is preferably usable.

In the present invention, an antioxidant, a pigment, a dye, a reinforcing agent, a filler, a UV absorbing agent, a lubricant, a releasing agent, a crystal nucleation agent, a plasticizer, a fluidity improving agent, an antistatic agent, an antibacterial agent or the like is preferably added as well as the above-mentioned thermal stabilizer and hydrolysis stabilizer.

A preferable method for producing an optical film according to the present invention is a method providing a highly uniform thickness and generating no gel, fisheye, scratch or the like, or a method preventing the film from having a large content of foreign substances. Usable methods include, for example, a solution cast method, a melt extrusion method, a calender method and the like, which are known. For stretching the film, a known method is usable. Vertical uniaxial stretching, horizontal uniaxial stretching, multi-stage stretching or simultaneous biaxial stretching or the like is usable.

The optical film according to the present invention is preferably transparent. It is preferable that the haze value is 3% or lower and that the total light transmittance is 85% or higher. The stretching ratio realized by the stretching processing may be any value, and is preferably 1.1 to 5 times, and more preferably 1.2 to 3 times. The stretching temperature with respect to the glass transition temperature (Tg) is preferably in the range of Tg−30° C. to Tg+50° C., and more preferably in the range of Tg−20° C. to Tg+30° C. The thickness of the optical film is preferably in the range of 1 to 200 µm, more preferably in the range of 10 to 150 µm, and still more preferably in the range of 15 to 100 µm.

The optical film according to the present invention is usable as a phase film. Where the optical film has been processed by uniaxial stretching, biaxial stretching or the like, the viewing angle can be improved by controlling the refractive index along X axis, Y axis or Z axis. A plurality of optical films according to the present invention can be used to obtain a desired optical characteristic. For example, a ½ wave plate and a ¼ wave plate may be produced and attached together at an appropriate angle. Thus, a wide band ¼ wave plate can be produced. The phase contrast dispersion in accordance with the wavelength is preferably in the ranges of 0.99<Re (450)/Re (550)<1.05 and 0.95<Re (650)/Re (550)<1.10, and more preferably in the ranges of 0.99<Re (450)/Re (550)<1.03 and 0.98<Re (650)/Re (550)<1.01. Similarly, a wide band ½ wave plate can be produced by attaching together ½ wave plates.

The optical film according to the present invention can be attached to a polarization plate via a tacky layer or an adhesive layer to form a circular polarization plate or an elliptical polarization plate. The optical film according to the present invention can also be attached directly to a PVA film used for a polarization layer of the polarization plate. A representative polarization layer is a uniaxially stretched PVA-based film having iodine or dichroic dye adsorbing and fixed thereto. Such a PVA film is thin and weak, and so is protected on both surfaces thereof by a TAC film having good optical characteristics. By attaching the optical film according to the present invention directly to the PVA film without using the TAC film, the number of elements of, and the thickness of, the polarization plate can be reduced.

As an adhesive for attaching the optical film according to the present invention to the PVA film, a water soluble PVA resin is mainly used. There is no specific limitation on the polymerization degree of the PVA-based resin. Usually, a polymerization degree of 1000 to 5000 is selected, and a polymerization degree of 500 to 3500 is especially preferable. There is no limit on the saponification value as long as the adhesive is water soluble. The saponification value is selected from the range of 70 to 100 mol %, and more preferably from the range of 90 to 100 mol %.

A suitable adhesive other than a water soluble adhesive is a polymer which is polymerized by at least one bonding group selected from amide bond, ester bond, urethane bond and ether bond, and which has a number average molecular weight of 600 to 200,000, preferably of 5,000 to 100,000.

The optical film according to the present invention can be used to produce a stacking film having a viewing angle and a wide band application with an arrangement described in "Society for Information Display 2001 International Symposium Digest of Technical Papers", pp. 906-909. The optical film according to the present invention may be used in a liquid crystal display together with a phase film different from the optical film according to the present invention, for example, an optical compensation film formed of a polymer liquid crystal material, a wide viewing angle film obtained by aligning and curing a discotic liquid crystal material, or the like.

The optical film according to the present invention is usable in any field with no specific limitation as long as the characteristics thereof are well utilized. The optical film according to the present invention is preferably usable in, for example, optical devices such as liquid crystal displays, organic or inorganic electroluminescence elements, plasma displays, CRTs, liquid crystal projectors, optical pickup systems in optical recording/reproduction devices, touch panels, reflection preventive films and the like.

EXAMPLES

The present invention will be described in more detail by way of examples. The present invention is not limited to any of the following examples.

In the following examples, the molecular weight was measured as a styrene-converted weight average molecular weight (Mw) by GPC (GPC System-21H produced by Showa Denko K.K. using chloroform as a solvent. The glass transition temperature (Tg) was measured by a differential scanning calorimeter (DSC) produced by Seiko Instruments Inc. The phase contrast dispersion in accordance with the wavelength was measured on stretched films in the wavelength range of 400 to 800 nm using ellipsometer M220 produced by JASCO Corporation. The photo-elastic coefficient was calculated from a refractive index with respect to a load change, which was measured on a cast film having a thickness of 100 μm at a wavelength of 633 nm by an ellipsometer. The tensile strength was measured on a cast film having a thickness of 100 μm in accordance with JIS-K7127. The water vapor permeability ratio was measured under the conditions of 40° C./90% RH using L80-4000L produced by LYSSY AG ZLLIKON in accordance with method A of JIS-K7209. The water absorption ratio was measured after the film was immersed in 23° C. water, as a weight change until saturation, in accordance with method of JIS-K7209.

The films in the following examples were produced by a solution cast method. Specifically, the resin was dissolved in dichloromethane at a concentration of 5% by weight and flown on a cast plate which had been confirmed to be horizontal. Next, the cast solution was vaporized while the vaporizing amount of the solvent from the cast solution was adjusted. Thus, a transparent film having a thickness of about 100 μm was obtained. The obtained film was fully dried in a vacuum drier at a temperature equal to or lower than the glass transition temperature. The film was stretched as follows. A sample of 5 cm×5 cm was cut out from the film obtained by the solution cast method, and was stretched by an uniaxial stretcher at a constant temperature at a stretching rate of 15 mm/min. and a stretching ratio of 1.5 times.

Example 1

5.846 kg (40 mols) of isosorbide (ISB) (dihydroxy compound represented by the formula (4)), 0.079 kg (0.4 mols) of tricyclodecanedimethanol (TCDDM) (dihydroxy compound represented by the general formula (5)), 8.869 kg (41.40 mols) of diphenyl carbonate (DPC) (carbonic acid diester), and 0.00123 g ($1.46 \times 10^{-5}$ mols) of sodium hydrogen carbonate were put into a 50-liter reactor including a stirrer and a distillation apparatus. These substances were heated up to 215° C. over 1 hour in a nitrogen atmosphere of 760 Torr while being stirred. Then, the pressure was adjusted to be reduced to 150 Ton over 30 minutes, and transesterification reaction was performed for 40 minutes under the conditions of 215° C. and 150 Torr. Then, the temperature was raised to 240° C. at a rate of 37.5° C./hr., and the temperature and the pressure were kept for 10 minutes at 240° C. and 150 Torr. Then, the pressure was adjusted to 120 Torr over 10 minutes, and the temperature and the pressure were kept for 70 minutes at 240° C. and 120 Torr. Then, the pressure was adjusted to 100 Torr over 10 minutes, and the temperature and the pressure were kept for 10 minutes at 240° C. and 100 Torr. Then, the pressure was adjusted to 1 Torr or lower over 40 minutes. The polymerization reaction was performed under the conditions of 240° C. and 1 Torr or lower for 30 minutes with stirring. After the reaction was finished, nitrogen was blown into the reactor to pressurize the inside, and the generated polycarbonate resin was pulled out while being pelletized. The obtained polycarbonate resin had a molecular weight (Mw) of 71,400, and Tg of 165° C.

Using the obtained polycarbonate resin, a film having a thickness of about 100 μm was produced. The film having a thickness of about 100 μm was uniaxially stretched at 175° C. to obtain a stretched film having a thickness of 65 μm. The results of measurement of physical properties are shown in Table 1.

Example 2

A stretched film having a thickness of 65 μm was obtained in the same procedure as in Example 1 except that 2.923 kg (20 mols) of ISB, 3.926 kg (20 mols) of tricyclodecanedimethanol (TCDDM), and 8.869 kg (41.4 mols) of DPC were used and that the stretching temperature was changed to 115° C. The results of measurement of physical properties are shown in Table 1.

Examples 3 Through 6

The same procedure as in Example 2 was taken except that 3,9-bis(2-hydroxy-1,1-dimethylethyl)-2,4,8,10-tetraoxaspiro(5,5)undecane (SPG), pentacyclopentadecanedimethanol (PCPDM), 1,4-cyclohexanedimethanol (CHDM) or isomannide (IMA) was used at a composition ratio shown in Table 1 as a component to be copolymerized with ISB, instead of TCDDM, and that the stretching temperature was changed. The results of measurement of physical properties are shown in Table 1.

Comparative Example 1

The measurement was performed in the same manner as in the examples on Arton Film having a thickness of 100 μm produced by JSR Kabushiki Kaisha as a cyclic polyolefin film. The results of measurement of physical properties are shown in Table 1.

Example 7

The film produced in Example 2 was attached to both surfaces of a polarization film (stretched PVA film with iodine added thereto) having a thickness of 25 μm to produce a 20 cm×20 cm polarization plate. As an adhesive, an aqueous solution of PVA of a prescribed concentration having an average polymerization degree of 1700 (completed saponified) was used. The obtained polarization plate did not exhibit air bubble generation, warping or curling and had a good external appearance. After being left in an atmosphere of a temperature of 60° C. and a humidity of 95% for 500 hours, the obtained polarization plate did not show any change in the external appearance.

TABLE 1

| | Unit | Ex. 1 | Ex. 2 | Ex. 3 | Ex. 4 | Ex. 5 | Ex. 6 | Comparative Ex. 1 |
|---|---|---|---|---|---|---|---|---|
| ISB (formula (4)) | Mol % | 99 | 50 | 30 | 50 | 50 | 45 | — |
| TCDDM (formula (5)) | Mol % | 1 | 50 | 0 | 0 | 0 | 10 | — |
| SPG (formula (5)) | Mol % | 0 | 0 | 70 | 0 | 0 | 0 | — |
| PCPDM (formula (5)) | Mol % | 0 | 0 | 0 | 50 | 0 | 0 | — |
| CHDM (formula (5)) | Mol % | 0 | 0 | 0 | 0 | 50 | 0 | — |
| IMA (formula (4)) | Mol % | 0 | 0 | 0 | 0 | 0 | 45 | — |
| Photo-elastic coefficient | $10^{-12}$ m$^2$/N | 14 | 8 | 8 | 9 | 9 | 14 | 3 |
| Glass transition temperature | °C. | 165 | 104 | 115 | 148 | 102 | 189 | 168 |
| Re450/Re550 | | 1.022 | 1.020 | 1.019 | 1.019 | 1.019 | 1.022 | 1.013 |
| Re650/Re550 | | 0.988 | 0.989 | 0.990 | 0.990 | 0.990 | 0.988 | 0.996 |
| Tensile test | Yield (MPa) | 85 | 75 | 83 | 85 | 80 | 90 | 82 |
| | Elongation (%) | 30 | 30 | 54 | 30 | 40 | 10 | 3 |
| Molecular weight (Mw) | $10^4$ | 7.1 | 5.9 | 6.1 | 6.0 | 6.0 | 6.0 | — |
| Water absorption ratio | % | 4.0 | 1.5 | 1.0 | 1.0 | 2.0 | 0.68 | 0.1 |
| Water vapor permeability ratio | g/m$^2$/day/25 μm | 1270 | 500 | 160 | 200 | 600 | 1400 | 30 |

* Re450, Re550, Re650: phase contrast (nm) at measured wavelength of 450 nm, 550 nm, 650 nm

INDUSTRIAL APPLICABILITY

According to a preferable embodiment of the present invention, a polycarbonate resin and an optical film having a low photo-elastic coefficient and controlled water vapor permeability can be produced. By combining an optical film according to the present invention with a polarization plate or a polarization film, wide viewing angle films, circular polarization plates or elliptical polarization plates can be produced. The wide viewing angle films are usable in liquid crystal displays, and the circular polarization plates are usable as a reflection preventive film in organic or inorganic electroluminescence elements, touch panels, plasma displays, CRTs, liquid crystal displays and the like.

The invention claimed is:

1. An optical film comprising a polycarbonate consisting of two structural units represented by the following formula (1) and the following general formula (2):

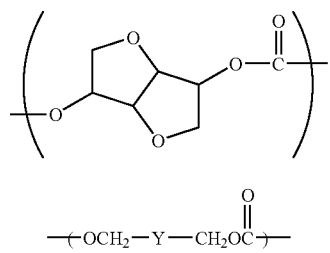

(1)

(2)

$-\!\!-\!(OCH_2-Y-CH_2OC)\!-\!\!-$ wherein Y is a cycloalkylene group having a carbon number of 4 through 20 or a structure represented by the following general formula (3):

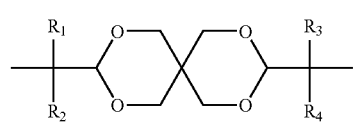

(3)

wherein $R_1$, $R_2$, $R_3$ and $R_4$ are independently a hydrogen atom or a monovalent alkyl group having a carbon number of 1 through 5, the molar ratio AB of structural unit (A) represented by the formula (1) and structural unit (B) represented by the general formula (2) is 50/50 to 30/70, a water vapor permeability is 100 g/m$^2$/day/25 μm or higher and a photo-elastic coefficient is $9\times10^{-12}$ m$^2$/N or lower.

2. The optical film according to claim 1, wherein the structural unit represented by the general formula (2) is derived from tricycle[5.2.1.0$^{2,6}$]decanedimethanol, 1,4-cyclohexanedimethanol, pentacyclopentadecanedimethanol, or 3,9-bis(2-hydroxy-1,1-dimethylethyl)-2,4,8,10-tetraoxaspiro(5,5)undecane.

3. A phase film obtained by stretching the optical film according to claim 2.

4. The phase film according to claim 3, wherein Re450, Re550, and Re650 which are the phase contrasts (Tim) of the optical film at measured wavelength of 450 nm, 550 nm, and 650 nm, satisfy the following formulas (A) and (B):

$$0.99 < Re450/Re550 < 1.05 \quad (A)$$

$$0.95 < Re650/Re550 < 1.10 \quad (B).$$

5. A polarization plate comprising a protective layer in the form of the optical film according to claim 2.

6. A phase film obtained by stretching the optical film according to claim 1.

7. The phase film according to claim 6, wherein Re450, Re550, and Re650 which are the phase contrasts (nm) of the optical film at measured wavelength of 450 nm, 550 nm, and 650 nm, satisfy the following formulas (A) and (B):

$$0.99 < Re450/Re550 < 1.05 \quad (A)$$

$$0.95 < Re650/Re550 < 1.10 \quad (B).$$

8. A polarization plate comprising a protective layer in the form of the optical film according to claim 1.

* * * * *